(12) United States Patent  
Rissanen

(10) Patent No.: US 8,930,403 B2
(45) Date of Patent: *Jan. 6, 2015

(54) FINE-GRAINED RELATIONAL DATABASE ACCESS-CONTROL POLICY ENFORCEMENT USING REVERSE QUERIES

(71) Applicant: Axiomatics AB, Stockholm (SE)

(72) Inventor: Erik Rissanen, Stockholm (SE)

(73) Assignee: Axiomatics AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/335,252

(22) Filed: Jul. 18, 2014

(65) Prior Publication Data

US 2014/0330856 A1  Nov. 6, 2014

Related U.S. Application Data

(63) Continuation of application No. 14/113,493, filed as application No. PCT/EP2012/058193 on May 4, 2012.

(60) Provisional application No. 61/482,777, filed on May 5, 2011.

(30) Foreign Application Priority Data

May 5, 2011  (EP) .................................... 11164924

(51) Int. Cl.
*G06F 17/30* (2006.01)
*G06F 21/62* (2013.01)
(52) U.S. Cl.
CPC ...... *G06F 17/30448* (2013.01); *G06F 21/6218* (2013.01)
USPC ............ 707/785; 707/786; 707/787; 707/788
(58) Field of Classification Search
CPC ................................ G06F 17/30448
USPC .................................................. 707/785–788
See application file for complete search history.

(56) References Cited

U.S. PATENT DOCUMENTS 6,438,549 B1 * 8/2002 Aldred et al. ................. 707/640
6,581,060 B1 * 6/2003 Choy ............................ 707/694

(Continued)

FOREIGN PATENT DOCUMENTS

WO  WO 2010/128926 A1  11/2010

OTHER PUBLICATIONS

International Search Report (PCT/ISA/210) mailed on Jun. 18, 2012, by the European Patent Office as the International Searching Authority for International Application No. PCT/EP2012/058193.

(Continued)

*Primary Examiner* — Frantz Coby
(74) *Attorney, Agent, or Firm* — Buchanan Ingersoll & Rooney P.C.

(57) ABSTRACT

A method of providing access control to a relational database accessible from a user interface is implemented at a policy enforcement point, which is located between the database and the user interface and includes the steps of: (i) intercepting a database query from a user; (ii) assigning attribute values on the basis of a target table or target column in the query, a construct type in the query, or the user or environment; (iii) partially evaluating an access-control policy defined in terms of said attributes, by constructing a partial policy decision request containing the attribute values assigned in step ii) and evaluating the AC policy for this, whereby a simplified policy is obtained; (iv) deriving an access condition, for which the simplified policy permit access; and (v) amending the database query by imposing said access condition and transmitting the amended query to the database.

18 Claims, 2 Drawing Sheets

(56) References Cited

U.S. PATENT DOCUMENTS

| | | | |
|---|---|---|---|
| 6,757,680 B1 * | 6/2004 | Choy | 1/1 |
| 6,823,338 B1 * | 11/2004 | Byrne et al. | 1/1 |
| 7,216,126 B2 * | 5/2007 | Choy | 707/785 |
| 7,243,097 B1 | 7/2007 | Agrawal et al. | |
| 7,437,362 B1 | 10/2008 | Ben-Natan | |
| 7,797,276 B1 * | 9/2010 | Yang | 707/636 |
| 2003/0191768 A1 * | 10/2003 | Choy | 707/100 |
| 2009/0006463 A1 | 1/2009 | Mehra et al. | |
| 2010/0262625 A1 * | 10/2010 | Pittenger | 707/783 |
| 2012/0066739 A1 | 3/2012 | Rissanen | |
| 2014/0208421 A1 * | 7/2014 | Rowney | 726/22 |
| 2014/0223508 A1 * | 8/2014 | Kao | 726/1 |

OTHER PUBLICATIONS

Sheldon B, Akers, "Binary Decision Diagrams", IEEE Transactions on Computers, vol. C-27, No. 6, Jun. 1978, pp. 509-516.

Randal E. Bryant, "Graph-Based Algorithms for Boolean Function Manipulation", 28 pages.

Anne Anderson, "The Relationship Between XACML and P3P Privacy Policies", Version 1.12, 1 page.

\* cited by examiner

FINE-GRAINED RELATIONAL DATABASE ACCESS-CONTROL POLICY ENFORCEMENT USING REVERSE QUERIES

CROSS REFERENCE TO RELATED APPLICATIONS

The present application is a continuation of U.S. application Ser. No. 14/113,493, filed on Oct. 23, 2013, which is a U.S. national stage of International Application No. PCT/EP2012/058193, filed on May 4, 2012, which claims the benefit of U.S. Provisional Application No. 61/482,777, filed on May 5, 2011. The entire contents of each of U.S. application Ser. No. 14/113,493, International Application No. PCT/EP2012/058193, and U.S. Provisional Application No. 61/482,777 are hereby incorporated herein by reference in their entirety.

FIELD OF THE INVENTION

The invention disclosed herein relates to the field of access control (AC) in computer systems and more particularly to methods and devices for enforcing an AC policy in a relational database.

BACKGROUND OF THE INVENTION

Relational databases store data structured in rows (tuples) in tables (relations) of columns (attributes). An intersection of a row and a column is referred to as a cell. A database need not comprise more than one row, table or column, respectively. Data are read and/or modified by means of queries to the database, which are composed by a human user or generated by an application or process that executes on a computer storing the database or is communicatively connected thereto. Queries may be conformal to a query language, such as SQL, for which syntactic and other rules are defined.

Access to reading or modifying the data may be restricted in which case the database must be protected with an AC policy that must be enforced. In many cases, the conditions for permitted access may:
  be fine grained, that is, the unit which must be protected in the database must be small, typically an individual cell. This means that the access conditions for each cell must be enforced individually;
  depend on data content of the database. For instance, to be permitted to access a cell with salary data, the conditions would depend on the values of other columns in the row being accessed;
  depend on external information related to the subject accessing the database, other data related to the data in the database or other contextual information.

Currently, the access restrictions of these fine-grained and data-dependent types are typically encoded by hand into the applications that generate database queries, so that non-permitted rows are filtered out. This is undesirable because the AC policy becomes embedded in the application, which results in a number of drawbacks:
  Changing the access control policy requires a change in the behavior of the application that generates queries, which may be difficult to achieve unless source code of the application is available.
  An application without proprietary access control cannot be protected at all unless it is modified, which may be difficult to achieve if source code of the application is not available.
  The access control policy is not clearly visible as such; rather it is distributed in the database queries and mixed with business-logic aspects, making it difficult to validate that the policy is correct or to understand which policy is being applied.

Existing approaches to apply access control policy outside the application SQL queries are restricted in their capabilities to express fine-grained conditions, conditions depending on external data and the richness of the conditional expressions themselves.

There currently exist general-purpose AC languages that have the richness to express fine-grained conditions and conditions which depend on external data. As explained in the note "The Relationship Between XACML and P3P Privacy Policies" by A. Anderson, Sun Microsystems, Inc. (2004), a first, low-level type of policy languages (e.g., Extensible Access Control Markup Language, XACML) is primarily aimed at expressing access-control policies in a form such that computers can enforce them. A second, high-level type of policy languages (e.g., the W3C Platform for Privacy Preferences, P3P) is inherently different from the first type, being primarily aimed at expressing access-control policies in a form that users can understand. As such, languages of the second type express privacy policies at a high level in generic user and data category terms, while those of the first type express privacy policies in terms of specific user identities or system-assigned user roles or other attributes, and in terms of specific data resource identities or system-assigned resource descriptors, hence in a fine-grained, internally applicable form. Clearly, the two types of policies serve complementary purposes.

A difficulty arising in connection with the low-level type of AC languages is how to apply it efficiently in order to control access to a relational database.

XACML is the subject of standardization work in a Technical Committee of the Organization for the Advancement of Structured Information Standards (see http://www.oasis-open.org). A policy encoded with XACML consists of functional expressions on the attribute values in the request and the return value of the policy is one of Permit, Deny, Not Applicable, or Indeterminate. An XACML policy can apply to many different situations, that is, different subjects, resources, actions and environments and may give different results for them. The XACML specification defines how such a request is evaluated against the policy, particularly what policy attributes are to be evaluated or, at least, which values are required to exist for a successful evaluation to result. Key characteristics of this evaluation process are that the request (the query against the policy) must describe the attempted access to a protected resource fully. In practice, it may be that the request is constructed in multiple stages by different components, so that a PEP (Policy Enforcement Point) provides only some initial attribute values and a PDP (Policy Decision Point) or other components can fetch more values from remote sources as they are needed. However, this does not change the situation that the policy cannot be evaluated unless all attribute values which describe the attempted access and are referenced by the policy are known, either directly, or through multi-stage lookup from one or more remote attribute sources.

The applicant has filed other patent applications within technology related to access control policies of the low-level type, in particular improvements to their implementation and management. For instance, the International Application published as WO 2010/128926 A1 discloses a method for controlling the distribution of policy data in a system. In one embodiment, a simplified policy is derived from a full policy by evaluating a partial access control request containing static attributes of a protected means. The resulting simplified policy is sent to a policy decision means, where it is used, as needed, for evaluating any further access control request relating to the protected means. By evaluating such further access control requests against a simplified policy, the computational load on the policy decision means is reduced.

U.S. Pat. No. 7,243,097 B1 belongs to the field of high-level policy languages, more precisely P3P. In a system described therein, a user query in a format adapted for submission to a database is transformed into an equivalent query that implements restrictions specifying access to data in the database. For this purpose, the system comprises a policy translator, which converts a policy in high-level, non-attribute-based language into restrictions that implement the policy. The transforming of the database query into an equivalent query relies on metadata stored in certain portions of the database, which much be accessed by the policy translator in order for it to complete the query trans-formation process. The user may access the database by means of the resulting equivalent query.

SUMMARY OF THE INVENTION

In view of the prior art discussed above, it is an object of the invention to provide methods and devices for controlling access to relational databases in an accurately controllable manner. In particular, it is an object to enforce an attribute-based access control policy in respect of access to a database. It is a further object to overcome or at least alleviate one or more limitations associated with the prior art, including compatibility with legacy technology, configurability after deployment and susceptibility of being validated.

Thus, as set forth in the independent claims, the invention provides a method, a policy enforcement point (PEP) and an access control system for providing access control in respect of a relational database. The dependent claims define advantageous embodiments of the invention.

Accordingly, in a first aspect, the invention provides a method for intercepting, processing and amending a query, so that the user who submitted the query—or the application which submitted the query on the user's behalf—will be permitted to read and/or modify database content to the extent that the AC policy allows this. The processing of the query includes determining the access condition(s) applicable in the context of the current database query in view of policy attribute values, e.g., the user's identity, the targeted tables and columns and/or environment information, such as time and location. Access conditions are determined by making a reverse policy query to the AC policy. The derivation of the access condition(s) may be simplified by evaluating the AC policy partially, whereby a simplified policy is obtained that may lend itself better to the reverse policy query. Further, in all cases where the policy contains attributes the values of which cannot be determined by the database, the partial evaluation also serves to eliminate those policy attributes before the query is handed over to the database. After an access condition has been derived, it is included into the query by amending the latter in conformity with the syntactic rules of the query language and the names used for referencing tables, columns etc. in the database. The amended query will return data from as many or fewer columns per row as the original query (e.g., projection operation; SQL: SELECT . . . FROM . . . WHERE . . . ) and/or will return as many or fewer rows as the original query (e.g., selection/restriction operation; SQL: SELECT * FROM . . . WHERE . . . ) and/or will modify as many or fewer rows than the original query (e.g., addition, deletion, replacement operations).

In a second aspect, the invention provides devices and a computer program product for carrying out this method.

The invention according to either aspect achieves the above objects since, firstly, the amended query may contain an access condition formulated in terms of a column value stored in the database, which allows row-wise selectivity. The access conditions may also affect a target column, so that column-wise selectivity is achieved. By allowing combinations of a condition on column values and a condition on target columns, the method allows access to the database to be controlled down to the level of single cells. Further, the invention enables enforcement of access conditions expressed as an ABAC policy, since some embodiments thereof are able to extract a relevant portion of the policy that can be integrated into a database query, in conformity with the database syntax.

Secondly, the invention can be easily integrated into an existing database system, such as by routing database queries via a unit for intercepting queries, wherein both the user interface and the database can be utilised without further modifications since the access control policy, despite being encoded with an attribute-based language, is enforced by modifying code in the query language for which the user interface and database are adapted.

Thirdly, since the AC policy is maintained separate from both the database and the user interface, the invention allows for easy modification of the policy en route. This is particularly so if the AC policy is stored in a unit (e.g., a policy decision point, PDP) separate from a PEP that performs the method and communicates with this unit in a just-in-time fashion. For instance, the PEP may be configured to request policy information at regular time intervals or at every $n^{th}$ query ($n \geq 1$) or may, which is preferable, communicate with the unit in terms of AC decision requests and AC decisions. According to this preferred option, the policy is hidden from the PEP, which however obtains all necessary decisions based on the policy from the unit storing the policy.

Fourthly, as yet another consequence of the separation of the policy-related functionalities (including both storage and enforcement) from the database functionalities, it is easy to monitor, validate and/or adjust the policy as needed.

The communication interface within the PEP may be further adapted to relay information transmitted from the database, in response to the amended query, to the user interface. Hence, the communication interface is responsible both for intercepting queries towards the database and for relaying information which the queries return. This makes the communication interface suitable for insertion into a communication line between the user interface to the database. In other words, as seen from the user interface, the database is located behind the communication interface. The PEP may be configured to pass the query on to the database only after checking the user's access rights and, possibly, after amending the query. Similarly, in cases where the query causes the database to return information, the method may include a step of relaying such information. It is noted that the relayed information may include both data extracted from the database and information confirming that database content has been modified.

The steps outlined above and set forth in the claims need not be performed by the same entity, but several connected units may cooperate to carry out the method. In an advantageous embodiment, the PEP comprises a communication interface, for intercepting and amending a query, and an attribute evaluating means, for assigning attribute values based on the query or on information relating to the entity submitting the query. The policy decision means and/or analysing means may then be located in a different unit, preferably a PDP or some other entity having access to the AC policy. In particular, the derivation of an access condition may be performed by an SAT solver (see below), to which the PDP or PEP is operable to submit a query. As an alternative, the derivation of an access condition may be carried out using techniques based on the theory of binary decision diagrams (BDDs) (see below). With this distribution of responsibilities, the amount of data exchanged between the PEP and the PDP can be kept low. This setup may also enable parallel execution of the processing tasks.

Protection is sought also for an AC system including the combination of a PEP and PDP communicatively connected thereto, which perform the inventive method jointly. Such an arrangement of a PEP and PDP may be deployed in a network between a relational database and a user interface from which queries to the database are submitted. The operative unit formed by the connected database, user interface, PEP and PDP may be described as an access-controlled database system operable to receive, store and output information subject to a precisely configurable AC policy.

In a further development to this, the step of amending the query may also be performed outside of the PEP. Thus, after interception and attribute value assignment, the query is sent together with data representing the attribute values to the PDP, which returns a query amended in accordance with the access conditions obtained by processing the assigned attribute values and the call to the AC policy. As an alternative, the PDP may additionally be responsible for assigning the attribute values on the basis of the query.

A typical application of the invention is where access to a specific target table or target column is controlled on the basis of environment-related and/or user-related information. Then, both resource attributes and attribute or environment attribute values are assigned. In a situation where the access policy does not contain conditions on attributes relating to anything but information to which the database has access, the invention may be embodied as a method or device for performing only said query interception, said derivation of access conditions and said amending of the query prior to its transmission to the database. Accordingly, since in that situation all policy conditions may be evaluated using only database information (that is, there are no policy attributes that need to be eliminated before the query is passed on to the database), the partial evaluation may be dropped and the AC policy replaces the simplified AC policy.

It is understood that the invention may be advantageously used in connection with an AC policy or a simplified AC policy encoded in XACML or a similar policy language which, like XACML, offers support for the operations discussed herein. Similarly, the database may for instance be one configured to execute queries in SQL.

Said partial evaluation of the AC policy may for instance proceed as described in full detail in the applicant's applications SE 1051167-3 and PCT/EP2011/069691, both of which are hereby incorporated by reference in their entirety. As such, the partial evaluation for a set of attributes may comprise the substeps of:

with the aid of a partial request generation means constructing a partial request from said the set of attributes via a policy information means;
sending said partial request to a partial evaluation means;
with the aid of a first storing means, storing all policies for all sets of attributes;
performing partial evaluation against the policy stored in said first storing means, resulting in a simplified policy; and
with the aid of a second storing means, storing said simplified policy.

Alternatively, the partial evaluation may proceed as follows:

inputting a full ABAC policy comprising a plurality of attribute-dependent expressions, wherein each expression is evaluable to one of Not applicable, Indeterminate and either Permit or Deny;
inputting a partial request comprising at least one attribute value and at least one attribute identified as variable;
partially evaluating said full ABAC policy by substituting said at least one attribute value for a corresponding attribute appearing in the policy, and forming, based on the evaluation result and predetermined simplification rules, a simplified ABAC policy equivalent to the full ABAC policy, wherein said simplified ABAC policy comprises an expression having a result data field for storing said evaluation result.

In this connection, the result data field comprises a condition result field, operable to store at least a Permit or Deny result from the evaluation of the expression itself, and/or a target result field, operable to store at least a Not applicable result from the evaluation of the expression itself. The result data field may comprise an argument data field operable to store a result from the evaluation of an expression which is subordinate to the expression itself.

With continued reference to the partial-evaluation process, the predetermined simplification rules may be one of the following:

i) a rule stipulating that an expression evaluable to only Indeterminate is formed in the simplified ABAC policy for each expression in the full ABAC policy which evaluates under the partial request to Indeterminate and which is connected by a deny-overrides combining algorithm to at least one expression that is evaluable to Permit and not completely evaluable under the partial request, wherein the value Indeterminate is stored in the result data field;

ii) a rule stipulating that an expression evaluable to only Indeterminate is formed in the simplified ABAC policy for each expression in the full ABAC policy which evaluates under the partial request to Indeterminate and which is connected by a permit-overrides combining algorithm to at least one expression that is evaluable to Deny and not completely evaluable under the partial request, wherein the value Indeterminate is stored in the result data field;

iii) a rule stipulating that an expression evaluable only to False is formed in the simplified ABAC policy for each expression in the full ABAC policy which evaluates under the partial request to False and which is connected by a Boolean AND function to at least one expression that is not completely evaluable under the partial request, wherein the value False is stored in the result data field;

iv) a rule stipulating that one expression evaluable only to Indeterminate is formed in the simplified ABAC policy if there is at least one expression in the full ABAC policy which evaluates under the partial request to Indeterminate and which is connected by a target-type combining algorithm to at least one expression that is not completely evaluable under the partial request, wherein the value Indeterminate is stored in the result data field.

These are but two options for implementing the partial evaluation. As noted above, this implementation is strictly speaking not an essential feature of the invention but may be useful to improve the performance of embodiments thereof.

The derivation of access conditions is advantageously performed using the approach described in the applicant's application SE 1051394-3 filed in the English language on 30 Dec.

2010, which is hereby incorporated by reference in its entirety. As further discussed in this co-pending application, this approach may include substeps of rewriting the AC policy (or simplified AC policy, as the case may be) by substituting at least one auxiliary policy attribute representing a true or false state of a policy condition on a policy attribute; representing the rewritten policy in a form allowing computer-aided satisfiability analysis; performing the satisfiability analysis to obtain a satisfiability condition in terms of at least one of the auxiliary policy attributes; and converting the satisfiability condition into an access condition on a policy attribute (or attribute in the simplified AC policy). Using this approach, the satisfiability analysis may be carried out by means of a simple, per se known SAT solver. As an alternative, the derivation of access conditions includes a step in which at least part of the policy is converted to BDD form, as explained in more detail in the applicant's application PCT/SE2011/050955, which is hereby incorporated by reference in its entirety. It is noted that the satisfiability condition may be empty, that is, the (simplified) policy will evaluate to Permit irrespective of the variable policy attributes. In this case, it may not be necessary to amend the database query.

It may be expedient to detect non-satisfiable access conditions at the PEP, that is, already when the method executes. When such non-satisfiable access conditions are found, the PEP may be configured not to pass the query on to the database. This means the database is relieved of some load, as is the communication line connecting it to the PEP. In a further development, the PEP may be configured to transmit a message to the user interface for notifying the user (or application acting on the user's behalf) indicating that the query has been denied access to the database.

In a situation where at least two target columns within one table appear in the database query, thereby leading to the assignment of at least two resource attributes, a preferred order of processing the query is to derive access conditions in respect of one target column at a time. The access conditions may then be imposed by amending the query. For instance, the different access conditions may be combined and then imposed by a single amendment operation. This approach has the advantage that the (partial) decision requests to be evaluated against the policy becomes fewer but simpler, which favours performance as the complexity is typically non-linear. If an AC language is used that allows requests relating to multiple resources, an alternative solution would for instance involve evaluating a full decision request involving resource attributes corresponding to several target columns, which may sometimes perform less well. It is noted that a query which requires access to multiple database column values to be evaluated usually does not pose a difficulty in this respect, as the retrieval of column values for the purpose of evaluating the policy can typically proceed without exposing the values to the query submitter (who may not be granted access to them), and so does not necessitate any policy evaluation in itself.

In a further development of the teachings in the preceding paragraph, a query which involves several target columns (or tables) and for which the applicable AC policy decides to deny read access to at least one column need not be entirely denied. Instead, the query may be amended to the effect that any values of columns to which access is denied are replaced by null values. This way, the query submitter obtains a masked view of the database contents, which may be experienced as preferable to a plain denial of access. Such partially restricted read access can be readily achieved once a query to multiple target columns has been partitioned into single-column queries. Write access to plural target columns (or tables) may be partially restricted in a similar fashion.

In an example embodiment, the PEP amends the database query in such manner that it contains a condition that is possible to assess only by retrieving information stored in the database. For this purpose, the PEP is adapted to associate policy attributes referring to a specific information type and structures in the database where this information is stored. Hence, during step iv), the PEP extracts an access condition from the policy that contains an attribute which can be assessed based on information stored in the database but which is not possible to assess neither based on the target table or target column in the query, nor on a construct type appearing in the query, nor on an identity of the user or on environment data. The PEP is adapted to convert this attribute in the access condition into an associated column and/or table in the database, so that the database, when it processes the amended query, will be able to retrieve the intended information, assess whether the access condition in the amended query is satisfied and return queried information to the user to the extent that the user is permitted access to the information. In the present disclosure, this is referred to as dynamic attribute-value retrieval.

Associating attributes and columns/tables, as described above, establishes a link between the policy and the database which allows dynamic attribute-value retrieval. This embodiment has an advantage over the prior art in that it offers an increased latitude in the formulation of the access rules in the ABAC policy. In a straightforward implementation, an access condition depending on a dynamic attribute value will require a separate preliminary database query—to be executed before the amended query is executed—for the sole purpose of converting this access condition into one that depends only on static attribute values. A straightforward implementation of this type will also be less accurate, since the information stored in the database may change between the executions of the preliminary database query and the amended query. Not least important, the present example embodiment will result in a smaller number of queries to be executed by the database, and therefore reduces the total load experienced by the database.

Furthermore, the invention relates to a preparatory process for modelling a set of desired access-control conditions in terms of target tables or columns defined in the database or in terms of data that are stored in the database. The availability of the preparatory process extends the range of uses of the invention. Indeed, by executing the preparatory process in connection with the invention, one may utilise the invention to enforce a set of AC condition of this type, in addition to the function of enforcing an attribute-based AC policy as described above. More precisely, the preparatory process defines an attribute-based AC policy, defines a new resource attribute in the policy and associates it with either a target table, target column (in terms of which a query may be expressed) or associates it with stored data which may or may not be retrieved in the database (i.e., column values, which are not limited to values of a target column in the query). The process further includes defining at least one action attribute in the policy and associating this with a database query construct type, such as SELECT in SQL. This means that the policy thus defined will include attributes reflecting the structure of the database. The policy will also reflect the query language for interacting with the database. The preparatory process finally includes the step of converting the AC conditions into one or more expressions formulated in terms of the resource and action attributes thus defined and including these into the AC policy. The preparatory process may be performed in preparation module that includes:
- a condition memory for receiving AC conditions,
- a policy memory for storing the policy structure,
- an attribute-defining means for receiving the column and table structure of the database as well as rules (grammar) governing the query language; and
- a processor for forming logical expressions in terms of the attributes on the basis of the AC conditions and entering these into the policy memory as elements of the policy.

It is noted that the invention relates to all feasible combinations of features, even if they are recited in different claims.

BRIEF DESCRIPTION OF THE DRAWINGS

Embodiments of the invention will now be described in more detail with reference to the accompanying drawings, on which.

DETAILED DESCRIPTION OF EMBODIMENTS

Figure 3:
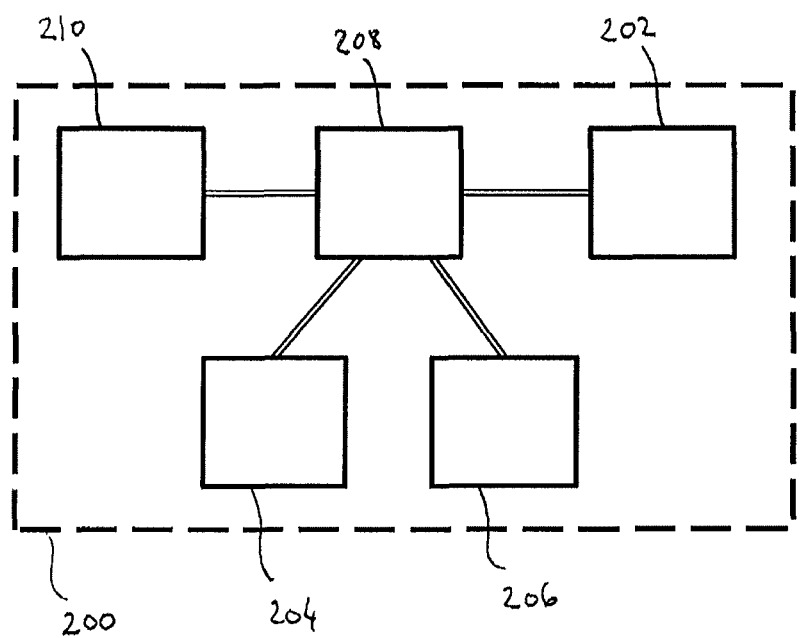
FIG. 3 illustrates an exemplifying AC policy architecture.

FIG. 3 is a generalised block diagram of the XACML architecture 200, although simplified, according to the prior art. As stated before, XACML is an access control policy language. An attempt to access a resource 202 is represented as a "Request", which lists attributes of the subject 204, the resource 202, the action and the environment 206. Most facts relating to the subject 204, the resource 202, the action and the environment 206 can be described in terms of attributes. An attribute is an identifier, a data type and a value. It can also be described as a variable with a name (the identifier), a data type and a value.

The request is constructed by a PEP 208. The purpose of a PEP 208 is to guard access to a resource 202 and only let authorized users through. The PEP 208 itself does not know who is authorized; rather it submits the request to a PDP 210, which contain policies governing what requests are to be permitted or denied, respectively. The PDP 210 evaluates the policies and returns a permit/deny response to the PEP 208. The PEP 208 then either lets the access proceed or stops it.

A purpose of this architecture is to establish separation of concerns, that is, to differentiate between policy decision making and policy enforcement. Enforcement is by its nature specific to a particular resource 202, while a decision engine can be made general purpose and reusable.

In general, policies can be nested in a tree form. The combination of different policies is governed by combining algorithms, which define what policy takes precedence over another policy.

Figure 1:
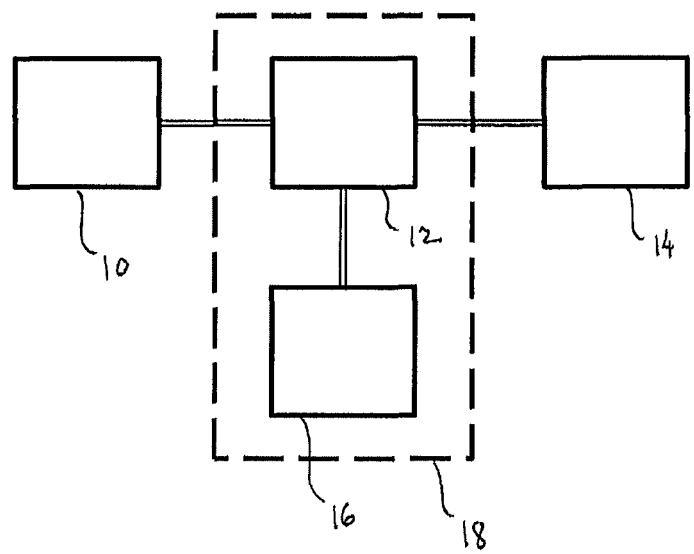
FIG. 1 is a generalised block diagram of an access-controlled database system in accordance with an embodiment of the invention.

Turning now to FIG. 1, there are illustrated a relational database 14 and a user interface 10 allowing a user or application to submit queries to the database in order to access or modify information contained therein. The database 14 and the user interface 10 are connected over a communication network (double lines) through the intermediary of an access control system 18, which comprises as sub-units a PEP 12 and a PDP 16. The access control system 18, and more precisely the PEP 12, is arranged so as to regulate the data flow to or from the database 14, in particular to intercept queries in order to provide access control in respect of the database 14.

Figure 2:
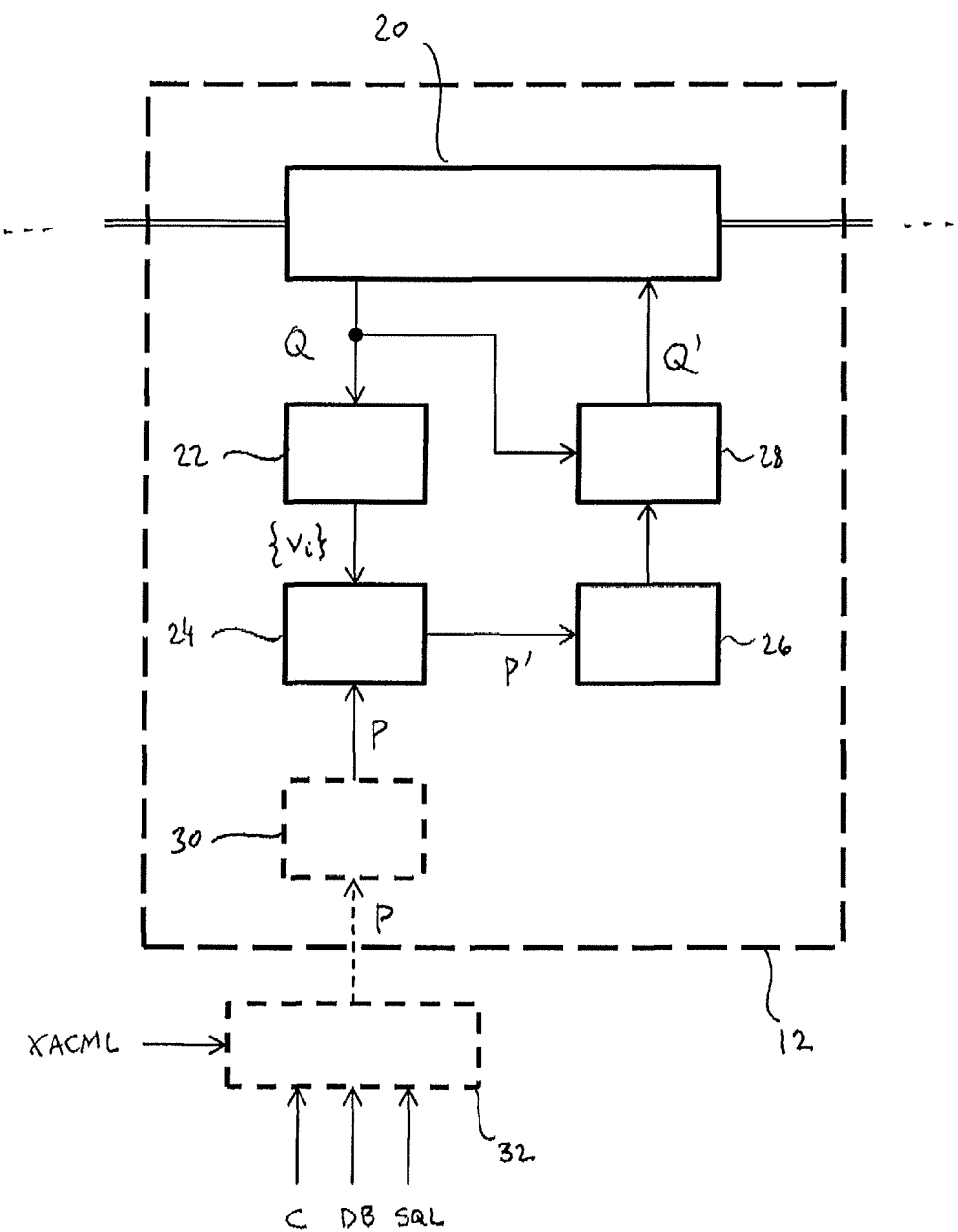
FIG. 2 shows a PEP.

As shown in FIG. 2, a PEP 12 may be of a standalone type, not requiring access to a separate PDP as in FIG. 1, and may then comprise the following sub-units. A communication interface 20 is connected to the network (double lines) and provides, in its turn, data to an attribute evaluating means 22 and a query modifying means 28 via a device-internal network (single lines). The data thus provided relate to a query Q intercepted from the communication network. The attribute evaluating means 22 supplies attribute values $\{v_i\}$, which have been extracted from the query or fetched by lookup from one or more remote attribute sources, to a policy decision means 24, which has access to AC policy information P stored in a policy memory 30, which may or may not be a part of the PEP 12. The policy decision means 24 evaluates the AC policy partially and forwards the result, a simplified AC policy P', to an analysing means 26 adapted to derive access conditions and supply these to the query modifying means 28. The query modifying means 28 amends the query Q on the basis of the access conditions thus obtained, and outputs an amended query Q' to the communication interface 20, which in normal circumstances forwards this to the database 14. The policy memory 30 may be supplied with new or updated policy information P from a preparation unit 32, which is aware of the policy language (shown symbolically as "XACML"), the way in which the database 14 is organised ("DB") and of the query language that it accepts ("SQL").

The operation of these units will now be illustrated by an example. The preparation unit 32 maps the database tables into resource attributes as follows by associating a named attribute to each column in the database. For instance, in a table "employee" with columns "salary", "name" and "org-unit", the preparation unit 32 may define the following AC language attributes: http://example.com/resource-salary, http://example.com/resource-subject-id, http://example.com/resource-organization. The database queries are mapped into action attributes as follows:

The construct type (predicate) is mapped to a named attribute, for instance one called "http://example.com/database-action".

The columns targeted by the query are mapped to a named attribute, for instance one called "http://example.com/target-column".

The table targeted by the query is mapped to a named attributes, for instance on called "http://example.com/target-table"

For instance, the SQL select statement
SELECT salary FROM employee;
could be mapped into the following attributes: http://example.com/database-action='select', http://example.com/target-column='salary', http://example.com/target-table='employee'.

It has been described above how a statement targeting multiple columns can be treated expediently by being partitioned into a number of less complex sub-queries.

For writing the XACML policy, the context for the access control check will be a single row in the database. In the policy, the following attributes are available for use:

The attributes from the database column mappings, which contain the values of the columns for the row that is being considered in the request.

The attributes from the query mapping. These point out which table and which column is being accessed with which operation.

Any other attributes provided by the PEP from the context of the database access, for instance the authenticated subject, time of day, method of communication and so on.

Any other attributes provided by a PDP context handler, for instance attributes from a corporate directory.

For the sake of the example, assume that the subject-id is provided by the PEP and that the PDP context handler is capable of resolving the "http://example.com/subject-organization" and "http://example.com/subject-role" attributes from a corporate directory. For example, let the access policy be that a subject with role "manager" may access the "salary" column of the "employee" table if the organizational membership of that particular employee equals the organizational membership of the subject performing the database access. This may be expressed as follows in XACML 3.0:

```
<xacml3:Policy xmlns:xacml3="urn:oasis:names:tc:xacml:3.0:core:schema:wd-17" PolicyId="60e28952-4f3f-4220-a94b-
d1bf7258030b" RuleCombiningAlgId="urn:oasis:names:tc:xacml:3.0:rule-combining-algorithm:deny-overrides" Version="1.0">
    <xacml3:Description/>
<xacml3:PolicyDefaults><xacml3:XPathVersion>http://www.w3.org/TR/1999/REC-xpath-
19991116</xacml3:XPathVersion></xacml3:PolicyDefaults>
    <xacml3:Target>
        <xacml3:AnyOf>
            <xacml3:AllOf>
                <xacml3:Match MatchId="urn:oasis:names:tc:xacml:1.0:function:string-equal">
                    <xacml3:AttributeValue DataType="http://www.w3.org/2001/XMLSchema#string">manager</xacml3:AttributeValue>
                    <xacml3:AttributeDesignator AttributeId="http://example.com/subject-role"
Category="urn:oasis:names:tc:xacml:1.0:subject-category:access-subject"
DataType="http://www.w3.org/20011XMLSchema#string"MustBePresent="false"/>
                </xacml3:Match>
                <xacml3:Match MatchId="urn:oasis:names:tc:xacml:1.0:function:string-equal">
                    <xacml3:AttributeValue DataType="http://www.w3.org/2001/XMLSchema#string">salary</xacml3:AttributeValue>
                    <xacml3:AttributeDesignator AttributeId=http://example.com/target-column"
Category="urn:oasis:names:tc:xacml:3.0:attribute-category:action" DataType="http://www.w3.org/2001/XMLSchema#string"
MustBePresent="false"/>
                </xacml3:Match>
                <xacml3:Match MatchId="urn:oasis:names:tc:xacml:1.0:function:string-equal">
                    <xacml3:AttributeValue DataType="http://www.w3.org/2001/XMLSchema#string">employee</xacml3:AttributeValue>
                    <xacml3:AttributeDesignator AttributeId="http://example.com/target-table"
Category="urn:oasis:names:tc:xacml:3.0:attribute-category:action" DataType="http://www.w3.org/2001/XMLSchema#string"
MustBePresent="false"/>
                </xacml3:Match>
            </xacml3:AllOf>
        </xacml3:AnyOf>
    </xacml3:Target>
    <xacml3:Rule Effect="Permit"RuleId="231ca894-85fb-4744-a45f-c6bc0008ce71">
        <xacml3:Description/>
        <xacml3:Target/>
        <xacml3:Condition>
            <xacml3:Apply FunctionId="urn:oasis:names:tc:xacml:1.0:function:string-equal">
                <xacml3:Description/>
                <xacml3:Apply FunctionId="urn:oasis:names:tc:xacml:1.0:function:string-one-and-only">
                    <xacml3:Description/>
                    <xacml3:AttributeDesignator AttributeId="http://example.com/subject-organization"
Category="urn:oasis:names:tc:xacml:1.0:subject-category:access-subject"
DataType="http://www.w3.org/2001/XMLSchema#string" MustBePresent="false"/>
                </xacml3:Apply>
                <xacml3:Apply FunctionId="urn:oasis:names:tc:xacml:1.0:function:string-one-and-only">
                    <xacml3:Description/>
                    <xacml3:AttributeDesignator AttributeId="http://example.com/resource-organization"
Category="urn:oasis:names:tc:xacml:3.0:attribute-category:resource" DataType="http://www.w3.org/2001/XMLSchema#string"
MustBePresent="false"/>
                </xacml3:Apply>
            </xacml3:Apply>
        </xacml3:Condition>
    </xacml3:Rule>
</xacml3:Policy>
```

Now assume this policy information is accessible to the policy decision means 24 and that the following SQL query is intercepted by the communication interface 20:
SELECT salary FROM employee WHERE name='Bob'.
It is assumed that Alice, who performs this query, has the role "manager" and belongs to the organisational unit "sales". The content of the "employee" table is assumed to be:

| Name | Org-unit | Salary |
| --- | --- | --- |
| Bob | Sales | 10,000 |
| Carol | Engineering | 15,000 |

The attributes of the database column mappings are not part of the decision request on which the partial evaluation is to be performed. Instead, the policy attributes are:
the attributes from the query mapping, which point out which table and which column are being accessed and with what operation;
any other attributes derivable from the context of the database query, such as the authenticated subject, time of day, method of communication and so on.

In this case they are for example: http://example.com/database-action='select', http://example.com/target-column='salary', http://example.com/target-table='employee', urn:oasis:names:tc:xacml:1.0:subject:subject-id='Alice'. Other attributes are undefined in the partial query, so that the partial request in the example has the following appearance:

| Subject | urn:oasis:names:tc:xacml:1.0:subject:subject-id = 'Alice' |
| --- | --- |
| | <undefined> |
| Resource | <undefined> |
| Action | http://example.com/database-action = 'select' |
| | http://example.com/target-column = 'salary' |
| | http://example.com/target-table = 'employee' |
| | <undefined> | or, coded in a partial request language which contains attributes in the XACML encoding format:

```xml
<Request xmlns="http://example.com/partial-request-schema">
    <Attributes Category="urn:oasis:names:tc:xacml:3.0:attribute-category:action" >
        <Attribute AttributeId="http://example.com/target-table">
            <AttributeValue DataType="http://www.w3.org/2001/XMLSchema#string">employee</AttributeValue>
        </Attribute>
        <Attribute AttributeId="http://example.com/database-action">
            <AttributeValue DataType="http://www.w3.org/2001/XMLSchema#string">select</AttributeValue>
        </Attribute>
        <Attribute AttributeId="http://example.com/target-column">
            <AttributeValue DataType="http://www.w3.org/2001/XMLSchema#string">salary</AttributeValue>
        </Attribute>
        <UndefinedAttributes/>
    </Attributes>
    <Attributes Category="urn:oasis:names:tc:xacml:3.0:attribute-category:resource" >
        <UndefinedAttributes/>
    </Attributes>
    <Attributes Category="urn:oasis:names:tc:xacml:1.0:subject-category:access-subject" >
        <Attribute AttributeId="urn:oasis:names:tc:xacml:1.0:subject:subject-id">
            <AttributeValue DataType="http://www.w3.org/2001/XMLSchema#string">Alice</AttributeValue>
        </Attribute>
        <UndefinedAttributes/>
    </Attributes>
    <Attributes Category="urn:oasis:names:tc:xacml:3.0:attribute-category:environment" >
    </Attributes>
</Request>
```

In this case, policy decision means 24 may during partial evaluation fetch the role and org-unit of the subject through the context handler from a remote policy information point (PIP), and the target matches and can be evaluated and the condition can be simplified as follows:

named Boolean attributes in an arbitrary category, for named Boolean attributes in an arbitrary category, for instance the "environment". In the example case there is a single such condition, the <Apply>. A table of the condition mappings is maintained. In this case the result is like this:

```xml
<xacml3:Policy xmlns:xacml3="urn:oasis:names:tc:xacml:3.0:core:schema:wd-17" PolicyId="22312db5-a5f4-4c4d-8df2-1f39ff142c82" RuleCombiningAlgId="urn:oasis:names:tc:xacml:3.0:rule-combining-algorithm:deny-overrides" Version="1.0">
    <xacml3:Description/>
    <xacml3:PolicyDefaults><xacml3:XPathVersion>http://www.w3.org/TR/1999/REC-xpath-19991116</xacml3:XPathVersion></xacml3:PolicyDefaults>
    <xacml3:Target/>
    <xacml3:Rule Effect="Permit" RuleId="da566f42-cbd9-4f08-b782-7b8c0403f209">
        <xacml3:Description/>
        <xacml3:Target/>
        <xacml3:Condition>
            <xacml3:Apply FunctionId="urn:oasis:names:tc:xacml:1.0:function:string-equal">
                <xacml3:AttributeValue DataType="http://www.w3.org/2001/XMLSchema#string">sales<xacml3:AttributeValue>
                <xacml3:Apply FunctionId="urn:oasis:names:tc:xacml:1.0:function:string-one-and-only">
                    <xacml3:AttributeDesignator AttributeId="http://example.com/resource-organization" Category="urn:oasis:names:tc:xacml:3.0:attribute-category:resource"DataType="http://www.w3.org/2001/XMLSchema#string" MustBePresent="false"/>
                </xacml3:Apply>
            </xacml3:Apply>
        </xacml3:Condition>
    </xacml3:Rule>
</xacml3:Policy>
```

In the derivation of access conditions, which may be carried out by the analysing means 26, a first substep is to replace the simple Boolean conditions with auxiliary attributes, i.e.

| Boolean attribute | Corresponding condition |
|---|---|
| http://example.com/tmp-attr1 (environment) | `<xacml3:Apply FunctionId="urn:oasis:names:tc:xacml:1.0:function:string-equarl">`<br>`<xacml3:AttributeValue DataType="http://www.w3.org/2001/XMLSchema#string">sales<xacml3:AttributeValue>`<br>`<xacml3:Apply FunctionId="urn:oasis:names:tc:xacml:1.0:function:string-one-and-only">`<br>`<xacml3:AttributeDesignator AttributeId="http://example.com/resource-organization" Category="urn:oasis:names:tc:xacml:3.0:attribute-category:resource" DataType="http://www.w3.org/2001/XMLSchema#string" MustBePresent="false"/>`<br>`</xacml3:Apply>`<br>`</xacml3:Apply>` |

The policy now has the following appearance:

```
<xacml3:Policy xmlns:xacml3="urn:oasis:names:tc:xacml:3.0:core:schema:wd-17"PolicyId="bc47f341-c827-4fce-bafb-
c7485918d2d2" RuleCombiningAlgId="urn:oasis:names:tc:xacml:3.0:rule-combining-algorithm:deny-overrides" Version="1.0">
    <xacml3:Description/>
    <xacml3:PolicyDefaults><xacml3:XPathVersion>http://www.w3.org/TR/1999/REC-xpath-
19991116</xacml3:XPathVersion></xacml3:PolicyDefaults>
    <xacml3:Target/>
    <xacml3:Rule Effect="Permit" RuleId="1ff251fc-9012-4175-8578-cdb002d0054a">
        <xacml3:Description/>
        <xacml3:Target/>
        <xacml3:Condition>
            <xacml3:Apply FunctionId="urn:oasis:names:tc:xacml:1.0:function:boolean-one-and-only">
                <xacml3: Description/>
                <xacml3:AttributeDesignator AttributeId="http://example.com/tmp-attr1"
Category="urn:oasis:names:tc:xacml:3.0:attribute-category:environment"
DataType="http://www.w3.org/2001/XMLSchema#boolean" MustBePresent="false"/>
            </xacml3:Apply>
        </xacml3:Condition>
    </xacml3:Rule>
</xacml3:Policy>
```

In a second substep, the analyzing means 26 translates the resulting policy into a propositional logic expression and, in a third substep, a logical satisfiability analysis is performed on the resulting logical expression. The result of the analysis is a set of rows (tuples) of policy attribute value assignments which would satisfy the expression. In the example, there is one such tuple which contains one auxiliary attribute value assignment, namely http://example.com/tmp-attr1="true".

By selecting the attribute value assignments for the generated Boolean attributes which are set to "true" in the solution, it becomes apparent which conditions must be fulfilled in order for access to be permitted on a particular row according to the AC policy. These conditions can be translated, in a fourth substep, into the database query language by means of the column-to-attribute mapping and an understanding of the database query language. In the case of the example, the condition becomes: Org-unit="sales".

The query modifying means 28 then proceeds to append the resulting conditions to the original database query so that they restrict the query. In the example, it becomes:
SELECT salary FROM employee WHERE name='Bob' AND Org-unit="sales"
In this case, access was permitted, so the filtering did not have any additional effect.

Assuming instead that the example had been this:
SELECT salary FROM employee WHERE name='Carol',
in which case the resulting query would have become as follows:
SELECT salary FROM employee WHERE name='Carol' AND Org-unit="sales"
Clearly, this query will not result in anything.

Similarly, the query:
SELECT salary FROM employee
becomes
SELECT salary FROM employee WHERE Org-unit="sales",
which filters out the rows that do not belong to the same org unit as Alice.

Furthermore, it is assumed that the access policy provides that a subject may access the a row in the "salary" column of the "employee" table if the subject's own salary is greater than or equal to this row. To be able to impose an access condition of this type, it will be necessary to ascertain whether the requesting subject corresponds to any of the rows in the "salary" column and, if it does, whether the value of the salary of the subject is not less than the requested row. Both of these actions may, in a straightforward implementation, require execution of a query to the database. According to the present embodiment however, the analyzing means 26 recognizes the non-evaluated attribute (i.e., the salary of user Carol) as an attribute that can be evaluated based on information retrieved from the relational database. The condition to be appended by the query modifying means 28 is obtained by the column-to-attribute mapping already discussed, and the amended query Q' becomes as follows:
SELECT salary FROM employee WHERE salary >=(SELECT salary FROM employee WHERE name='Carol')
It is noted that the dynamic nature of the access condition is preserved, unlike a hypothetic amended query in which the access condition has been converted into static form by a preliminary database query, namely, assuming Carol's salary is 15,000:
SELECT salary FROM employee WHERE salary=<15000
Assuming the original query is in conformity with the syntax of the query language, the amended query has not undergone any amendment deviating from the syntax and will therefore be executed by the database. However, if Carol had not been included in the "employee" table, the database would have returned an error or a void result, similarly to the case where the salaries of all other employees in the "employee" table had been greater than Carol's salary. Hence, the information in the "employee" table is protected from unauthorized access, as required by the ABAC policy.

In an advantageous embodiment, the analyzing means 26 uses a technique based on the theory of binary decision diagrams (BDDs) and Reduced-Order BDDs (ROBDDs), as outlined in B. Akers, "Binary Decision Diagrams", *IEEE Trans. Comp.*, vol. C-27, no. 6 (1978), p. 509 and R. E. Bryant, "Graph-based algorithms for Boolean function manipulation", *IEEE Trans. Comp.*, vol. C-35, no. 8 (1986), p. 677. A plurality of references in this area describe algorithms for translating a logic expression into a BDD or ROBDD, as is done in the second substep, and there exist further algorithms for deriving exhaustive sets of solutions. These solutions may then be converted back into a form that will allow derivation of the set of rows (tuples) of policy attribute value assignments which would satisfy the expression. Implementations of such algorithms as libraries of computer-executable code can be retrieved from commercial or non-commercial sources. For example, the library JavaBDD can be retrieved from http://sourceforge.net, http://sourceforge.net/projects/javabdd, http://javabdd.sourceforge.net/ or archived versions of these pages. A further BDD package is BuDDy, downloadable from http://buddy.sourceforge.net.

Alternatively of additionally hereto, the policy decision means 24 may comprise at least the following components (not shown):
 a first storing means operable to store a full ABAC policy comprising a plurality of attribute-dependent expressions, wherein each expression is evaluable to one of Not applicable, Indeterminate and either Permit or Deny;
 a partial request generation means operable to construct a partial request comprising at least one attribute value and at least one attribute identified as variable; and
 a partial evaluation means operable to partially evaluate said full ABAC policy by substituting said at least one attribute value for a corresponding attribute appearing in the policy, and forming, based on the evaluation result and predetermined simplification rules, a simplified ABAC policy equivalent to the full ABAC policy comprising an expression having a result data field for storing said evaluation result.

Further embodiments of the present invention will become apparent to a person skilled in the art after studying the description above. Even though the present description and drawings disclose embodiments and examples, the invention is not restricted to these specific examples. Numerous modifications and variations can be made without departing from the scope of the present invention, which is defined by the accompanying claims. Any reference signs appearing in the claims are not to be understood as limiting their scope.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A method of providing access control (AC) in respect of a relational database storing information in tables and columns and being accessible from a user interface, which is configured to accept a database query from a user and return information extracted from the database, the method being implemented at least in part at a policy enforcement point (PEP), which is located between the database and the user interface, and comprising:
 i) intercepting, at the PEP, a database query;
 ii) assigning attribute values by performing at least one of the following substeps:
  ii-a) assigning a resource attribute value based on at least one target table or target column in the query;
  ii-b) assigning an action attribute value based on a construct type in the query; and
  ii-c) assigning a subject and/or environment attribute value based on an identity of the user or on environment data;
 iii) partially evaluating an attributed-based AC policy defined in terms of said attributes, by constructing a partial policy decision request containing the attribute values assigned in step ii) and evaluating the AC policy for this, whereby a simplified attribute-based AC policy is obtained;
 iv) deriving an access condition, for which the simplified AC policy evaluates to permit access; and
 v) amending the database query by imposing said access condition; and
 vi) transmitting the amended query to the database.

2. The method of claim 1, wherein step iv) includes the substeps of:
 rewriting the simplified policy by substituting one or more auxiliary attributes for a Boolean-valued condition;
 converting at least part of the rewritten policy into a binary decision diagram (BDD);
 analysing said binary decision diagram with respect to satisfiability in order to determine a satisfiability condition in terms of the one or more auxiliary attributes, wherein all paths in the binary decision diagram evaluating to either true or false are derived; and
 converting said satisfiability condition in terms of the one or more auxiliary attributes into an access condition in terms of one or more attributes in the simplified AC policy.

3. The method of claim 1, wherein, if the access condition derived in step iv) is not satisfiable, steps v) and vi) are replaced by the step of:
 v') sending a non-access notification to the user interface.

4. The method of claim 1, wherein:
 step ii-a) includes assigning resource attribute values based on at least two target columns; and
 a sequence of steps iii) and iv) is performed once for each resource attribute value thus assigned.

5. The method of claim 1, wherein:
 steps iii)-v) are performed at a policy decision point (PDP) communicatively connected to the PEP; and
 step iii) includes providing the PDP with data representing the attribute values.

6. The method of claim 1, wherein:
 step iii) is performed at a policy decision point (PDP), which is communicatively connected to the PEP and which the PEP provides with data representing the attribute values; and
 step v) is performed at the PEP.

7. The method of claim 1, wherein step ii) comprises at least substeps ii-a) and ii-c).

8. The method of claim 1, wherein one or more AC conditions in terms of database tables or columns or in terms of information stored in the database are initially provided, the method comprising the initial steps of:
 defining an attribute-based AC policy;

defining a resource attribute in the AC policy and associating this with one in the group comprising:
a target table or column appearing in a database query, and
information to be retrieved in a table and/or column;
defining an action attribute in the AC policy and associating this with a database query construct type; and
converting said one or more AC conditions into expressions in terms of at least the resource and action attributes thus defined and including these into the AC policy.

9. The method of claim 1, wherein the AC policy is encoded in Extended Access Control Markup Language (XACML).

10. The method of claim 1, further comprising defining a column-to-attribute mapping, wherein:
step iv) includes extracting an access condition containing a reference to a non-evaluated attribute; and
step v) includes converting, using the column-to-attribute mapping, the reference to a non-evaluated attribute into a reference to at least one column in the relational database and imposing the access condition after this conversion, for thereby causing the relational database to substitute information retrieved from said at least one column for the non-evaluated attribute during processing of the amended query.

11. An access-controlled database system comprising a policy enforcement point (PEP) for providing access control (AC) in respect of a relational database storing information in tables and columns,
the PEP being adapted to be located between the database and a user interface, which is configured to accept a database query from a user and return information extracted from the database, and
the PEP comprising the following communicatively connected sections:
a communication interface for intercepting a database query; and
attribute evaluating means for assigning attribute values by performing one of the following:
a) assigning a resource attribute value based on at least one target table or target column in the query;
b) assigning an action attribute value based on a construct type in the query; and
c) assigning a subject and/or environment attribute value based on at least an identity of the user or on environment data,
wherein the communication interface is further adapted to transmit an amended query, resulting from imposing an access condition derived from an attribute-based AC policy on the basis of attribute values provided by the attribute evaluating means, to the database.

12. The system of claim 11, wherein the PEP further comprises:
policy decision means for partially evaluating an attribute-based AC policy by evaluating the AC policy for a partial policy decision request constructed on the basis of attribute values provided by the attribute evaluating means, whereby a simplified attribute-based AC policy is obtained; and
analysing means for deriving an access condition, for which a simplified AC policy provided by the policy decision means evaluates to permit access.

13. The system of claim 12, wherein the analysing means of the PEP is adapted to:
rewrite a simplified policy by substituting one or more auxiliary attributes for a Boolean-valued condition (BDD);
convert at least part of the rewritten policy into a binary decision diagram;
analyse said binary decision diagram with respect to satisfiability in order to determine a satisfiability condition in terms of one or more auxiliary attributes, wherein all paths in the binary decision diagram evaluating to either true or false are derived; and
convert said satisfiability condition in terms of the one or more auxiliary attributes into an access condition in terms of one or more attributes in the simplified AC policy.

14. The system of claim 11, wherein the PEP further comprises query modifying means for amending the database query intercepted by the communication interface by imposing said access condition.

15. The system of claim 14, wherein the PEP is further adapted to detect any non-satisfiable access condition derived from the attribute-based AC policy, wherein the communication interface is configured to transmit, in response to detection of a non-satisfiable access condition, a non-access notification to the user interface.

16. The system of claim 11, comprising an access control system for providing access control in respect of a relational database storing information in tables and columns, the access control system comprising:
the PEP; and
a policy decision point (PDP), which is separate from the PEP and communicatively connected thereto, and configured to store an attribute-based AC policy,
wherein the access control system comprises:
policy decision means for partially evaluating an attribute-based AC policy by evaluating the AC policy for a partial policy decision request constructed on the basis of attribute values provided by the attribute evaluating means, whereby a simplified AC policy is obtained;
analysing means for deriving an access condition, for which a simplified AC policy provided by the policy decision means evaluates to permit access; and
query modifying means for amending the database query intercepted by the communication interface by imposing said access condition.

17. The access-controlled database system of claim 16, comprising:
a relational database storing information in tables and columns;
a user interface, which is configured to accept a database query from a user and return information extracted from the database; and
the access control system,
wherein the communication interface of the PEP within the access control system is located between the database and the user interface.

18. A computer program product comprising a non-transitory data carrier storing instructions for performing the method of claim 1.

* * * * *